United States Patent [19]

Namba

[11] Patent Number: 4,633,502

[45] Date of Patent: Dec. 30, 1986

[54] OPTICAL RECOGNIZING APPARATUS

[75] Inventor: Hiromi Namba, Tokorozawa, Japan

[73] Assignee: Kabushiki Kaisha Toshiba, Kawasaki, Japan

[21] Appl. No.: 749,209

[22] Filed: Jun. 27, 1985

[30] Foreign Application Priority Data

Jun. 29, 1984 [JP] Japan ............................... 59-134857

[51] Int. Cl.$^4$ ............................................. G06K 9/34
[52] U.S. Cl. .......................................... 382/9; 382/48
[58] Field of Search ................... 382/9, 48, 57

[56] References Cited

U.S. PATENT DOCUMENTS 4,292,622  9/1981  Henrichon, Jr. ........................ 382/9
4,377,803  3/1983  Lotspiech et al. ...................... 382/9

Primary Examiner—Leo H. Boudreau
Attorney, Agent, or Firm—Finnegan, Henderson, Farabow, Garrett & Dunner

[57] ABSTRACT

An optical recognizing apparatus is provided in which underlined characters are stored in a column pattern memory through a photodetector and a digitizer in the form of a dot pattern. The column pattern memory is scanned to detect the underline pattern, and the positional information of the detected pattern are stored in a memory provided within a microprocessor. The microprocessor computes the central position of the underline based on the position information, determines whether the respective dots are vertically above or below the central position of the underline white data or black data, and writes white data if the detected dot is black data. Such an operation is repeated for a predetermined number of dots of the underline. The above repetitive operation eliminates the underline. The character with underline removed is normalized in a normalizing circuit and is fed to a similarity computation circuit. The circuit determines its similarity with the use of a dictionary memory and recognizes the character.

6 Claims, 18 Drawing Figures

FIG. 1A
(PRIOR ART)
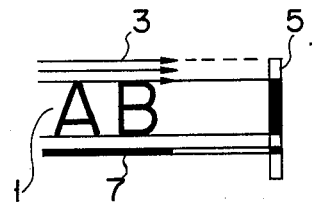
FIG. 1B
(PRIOR ART)
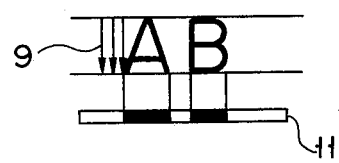
FIG. 1C
(PRIOR ART)
FIG. 1D
(PRIOR ART)
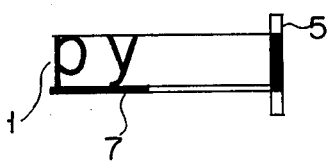
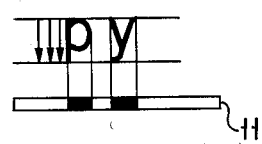
FIG. 2A
(PRIOR ART)
System
ca. 'n
ha
FIG. 2B
(PRIOR ART)
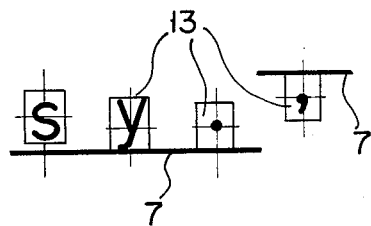

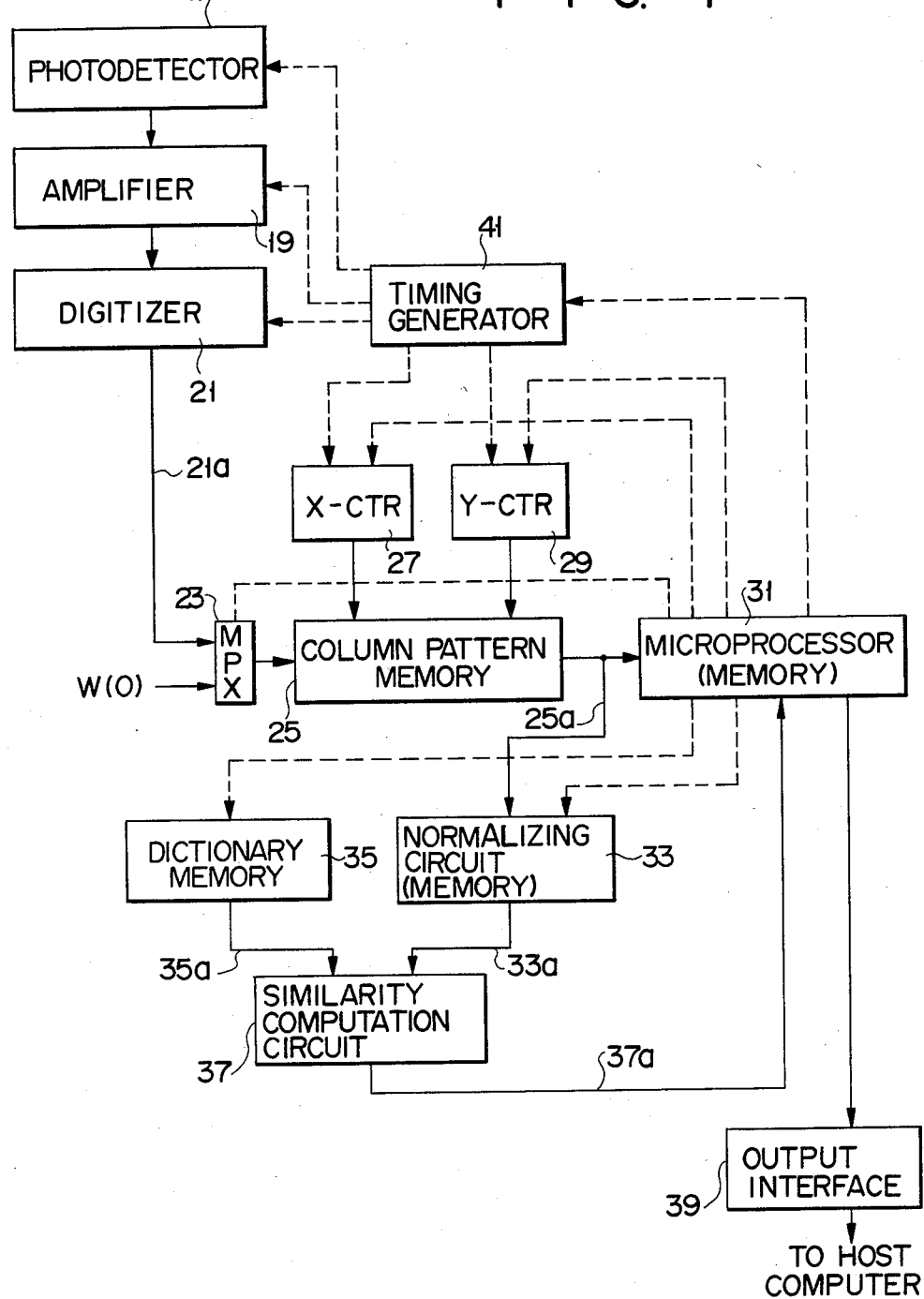

F I G. 10
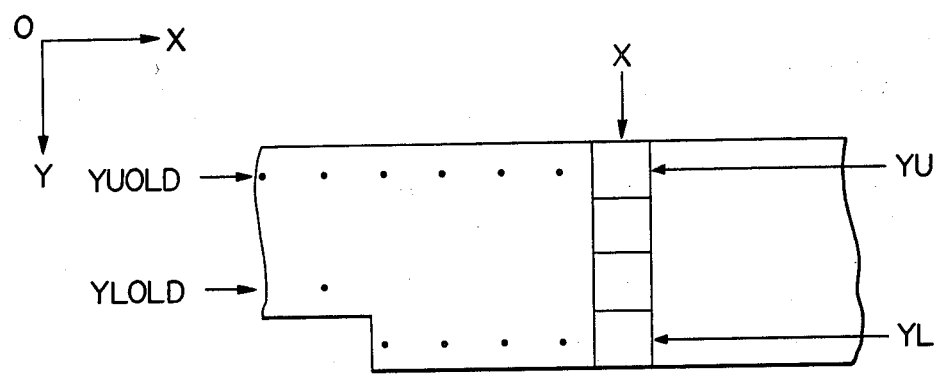
F I G. 11
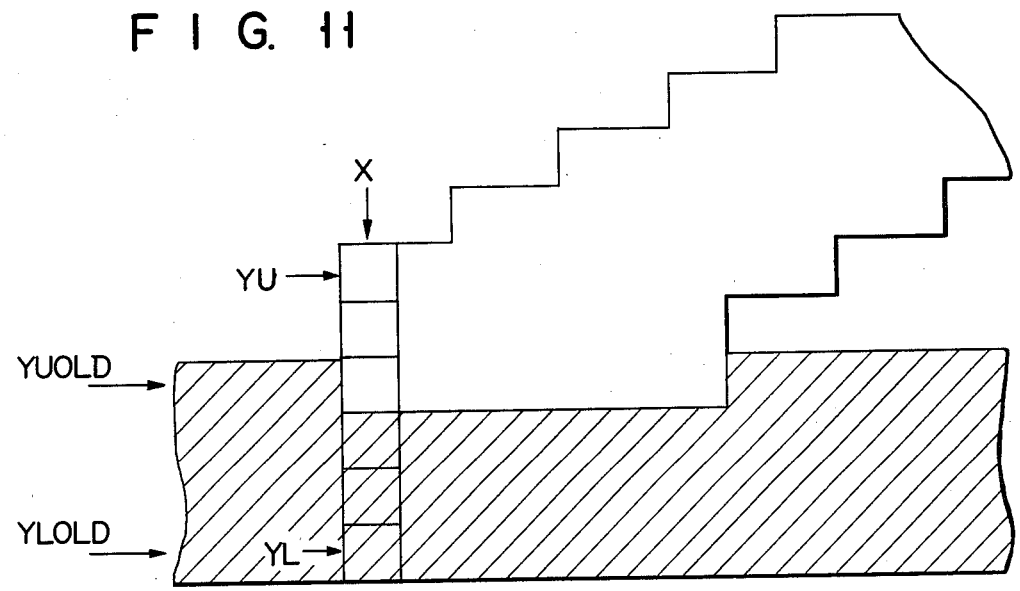

OPTICAL RECOGNIZING APPARATUS

BACKGROUND OF THE INVENTION

The present invention relates to an optical character reader (OCR) which can accurately recognize and read underlined characters.

The conventional OCR detects and extracts a single character from a character block using projection data arranged in columns (horizontal) and rows (vertical). However, the above method cannot detect, extract or recognize the adjacent characters individually when a plurality of subsequent characters are underlined.

An OCR which eliminates the above drawback is disclosed in U.S. Pat. No. 4,377,803 to Lotspiech et al., for the invention entitled "Algorithm of the Segmentation of Printed Fixed Pitch Documents." In this system, as shown in FIG. 1A, a character block 1 is scanned in the horizontal direction (hereafter referred to as row direction), designated by arrow 3, to form the projection data 5. Furthermore, as shown in FIG. 1A, when an underline 7 is spaced from the character block 1, the character block 1, except the underline 7, is scanned in the vertical direction designated by arrow 9 to obtain vertical projection data 11. The vertical projection data 11 is used to detect, extract, and recognize the respective characters of the character block 1. When the underline 7 contacts the characters as shown in FIG. 1C, the areas of the character block 1, except the portions corresponding to the width of the underline 7, are scanned to achieve the projection data 11 as shown in Fig. 1D. Thus, the projection data 11 is used to detect, extract and recognize the individual characters, as described above.

However, in the above OCR system, when the underlined characters have a narrow line space as shown in FIG. 2A, for example 6 lines/inch, the individual characters must be detected and extracted so as to exclude the underline of the character block on the line one line above. Such a way of processing causes the system construction to be complicated.

Furthermore, a system in which the underline is obtained by using the horizontal projection data (histogram) also has problems. For example, when the underlined characters show, as shown in FIG. 3A, those parts of the characters which are below the horizontal broken line, the position of the upper end of the underline are undesirably extracted. Consequently, the resultant characters, which are incomplete as shown in FIG. 3B, are not recognized, thereby considerably lowering the recognition accuracy.

Another type of OCR is disclosed in U.S. Pat. No. 4,292,622 to Henrichon, Jr. for the invention entitled: "System and Method for Processing Horizontal Line Characteristics in an Image." The disclosed system detects and eliminates the underline to thereby extract the individual characters. However, in this system when the underline contacts the characters, the elimination of the underline is inevitably accompanied by partial extraction of the bottom portions of the characters. This would inevitably reduce the accuracy of character recognition.

An OCR of the so-called pattern matching type is known. In this type of an OCR, a constant size of area, including character block, are extracted from the pattern memory and compared with the reference data for coincidence. However, the pattern of any character whose center is close to an underline may undesirably be extracted together with the underline. This would inevitably reduce the accuracy of character recognition.

SUMMARY OF THE INVENTION

Accordingly, the object of the present invention is to provide an optical character reader of a simple structure which can accurately recognize underlined characters and can output the recognition results of the underlined characters.

In the present invention, the underline can be eliminated and only the characters recognized when reading underlined characters. When the recognition results are output, the underline is combined with the recognized characters. The underlined characters can thus be accurately read. No complex data processing is involved in these operations.

According to the invention, there is provided an optical character reader comprising: a pattern memory for storing the patterns of characters and the pattern of an underline which are obtained by photoelectrically converting underlined characters printed on a sheet of paper; underline detecting means for detecting the patterns of the underline by scanning the patterns in said pattern memory, and for storing the positions of the detected underline patterns; underline erasing means for writing white data in the underline pattern region of said pattern memory to erase the underline pattern in accordance with the positions stored by said underline detecting means; character recognizing means for reading the character patterns from said pattern memory wherein the underline pattern has been erased by said underline erasing means, and for recognizing the character patterns read from said pattern memory; and output means for adding the underline pattern to each recognized character pattern in accordance with the position stored in said underline detecting means, and for supplying the combination of the underline pattern and character pattern.

BRIEF DESCRIPTION OF THE DRAWINGS

FIGS. 1A through 1D, FIGS. 2A and 2B, and FIGS. 3A and 3B are diagrams explaining the operations of the conventional optical character readers;

FIG. 4 is a block diagram of an optical character reader according to the present invention;

FIG. 10 illustrates how to erase the underline pattern from the column pattern memory when the pattern has a width of six dots or less;

FIG. 11 illustrates how to erase the underline when the pattern has a width of seven dots or more and has a straight lower edge;

DETAILED DESCRIPTION OF THE PREFERRED EMBODIMENTS

Figure 3A:
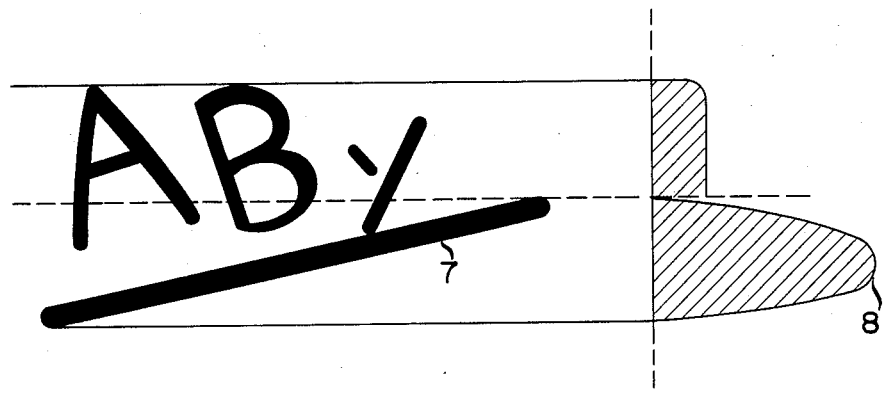
Figure 3B:

FIG. 4 is a block diagram of one embodiment of the invention, i.e., an optical character reader. In this optical character reader, a photodetector 17 scans and photoelectrically converts the characters and underlined characters printed on a sheet of paper. These signals from a photodetector 17 are amplified by an amplifier 19 and supplied to a digitizer 21. Digitizer 21 forms binary patterns 21a of the underlined characters, which are input to a multiplexer 23. Multiplexer 23 supplies patterns 21a to a column pattern memory 25 during the scan of the paper sheets by the photodetector 17. It also supplies white data W(0), i.e., logic "0" signals, to column pattern memory 25 in order to erase an underline pattern U (later described).

The addresses of column pattern memory 25 are designated by an X address counter 27 and a Y address counter 29. One line of binary pattern 21a is stored at the designated address of the memory 25. A microprocessor 31 controls the operation of OCR in accordance with the control program prestored in one memory and further executes, in the other memory, storing the positions of the underline as well as the underline erasing processing and, subsequently, the editing processing of combining the underline to the recognized characters. A character pattern 25a read from column pattern memory 25 is input to a normalizing circuit 33. Circuit 33 executes the normalizing process required for the recognition of the character pattern 25a output from the row pattern memory 25 and supplies the output data to a similarity computation circuit 37. Similarity computation circuit 37 computes the similarity of the character pattern 33a output from normalizing circuit 33 to the reference character patterns 35a stored in a dictionary memory 35. The recognition result (character code obtained from the pattern recognition) 37a from the circuit 37 is output to the microprocessor 31. Microprocessor 31 outputs a combination of the character code and positions of an underline pattern U detected by the method later described. The combination of the character code and positions is supplied through an output interface 39. Under the control of microprocessor 31, a timing generator 41 supplies timing signals to photodetector 17, amplifier 19, digitizer 21, X address counter 27 and Y address counter 29.

Figure 5:
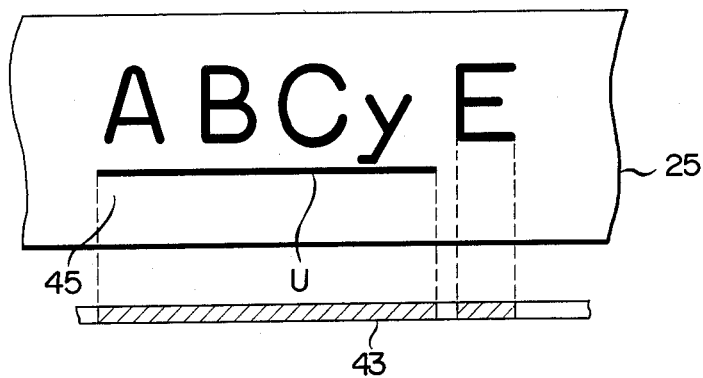
FIG. 5 schematically shows the data stored in the column pattern memory used in the embodiment of FIG. 4.
Figure 6:
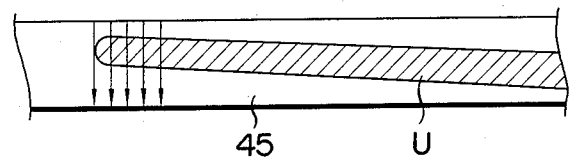
FIGS. 6, 7 and 8 illustrate the method of erasing the underline pattern from the column pattern memory in the embodiment of FIG. 4.
Figure 7:
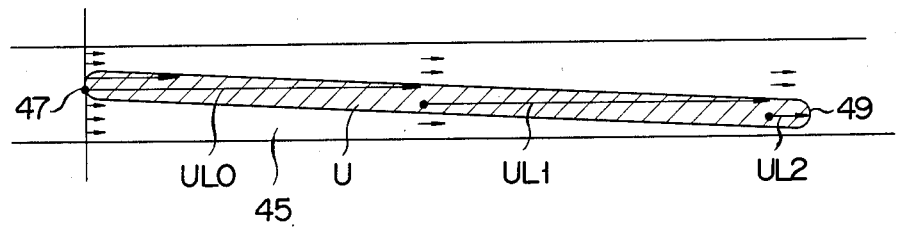

The operation of the optical character reader will now be described. First, photodetector 17 scans the printed sheet (not shown). Digitizer 21 generates binary patterns 21a including such an underline pattern U as shown in FIG. 5. Multiplexer 23 selects these patterns under the control of microprocessor 31. Patterns 21a are subsequently stored in column pattern memory 25. Microprocessor 31 scans column pattern memory 25, thus forming vertical projection data 43 of binary patterns 21a. It detects underline pattern U from vertical projection data 43. More specifically, when it is detected from projection data 43 that the length of any character block is over a predetermined value, microprocessor 31 scans the lower region 45 of the character block (i.e., a series of binary patterns 21a) in the vertical direction as shown in FIG. 6. It then counts "black dots" detected from each vertical scanning line. When the number of black dots detected from any vertical scanning line surpasses a predetermined value, microprocessor 31 determines that an underline pattern may exsist. Then, it scans the lower region 45 of the character block as shown in FIG. 7, along horizontal lines UL0, UL1, UL2, and so on. The scanning along each horizontal line is continued until two or more consecutive "white dots" are detected for the purpose of seeking a maximum-length tracking line. As shown in FIG. 7, first track scan line UL0, second track scan-line UL1 and third track scan-line UL2 are sequentially achieved. The achievement of the track scan-line is continued until the run length becomes 0.

The microprocessor 31 stores the track scan-line data achieved, as described above, in the associated memory as the positional information of the underline pattern U comprising start point coordinate data 47, end point coordinate data 49 and length data thereof.

Then, the microprocessor 31 executes erase processing of the underline U in the row pattern memory 25 in accordance with the achieved position information. More specifically, given that point A in FIG. 8 is the start point of the first track scan-line UL0, the erase processing is executed on the respective dots on the track scan-line, in accordance with the following algorithm, thereby erasing the underline pattern U.

Figure 8:
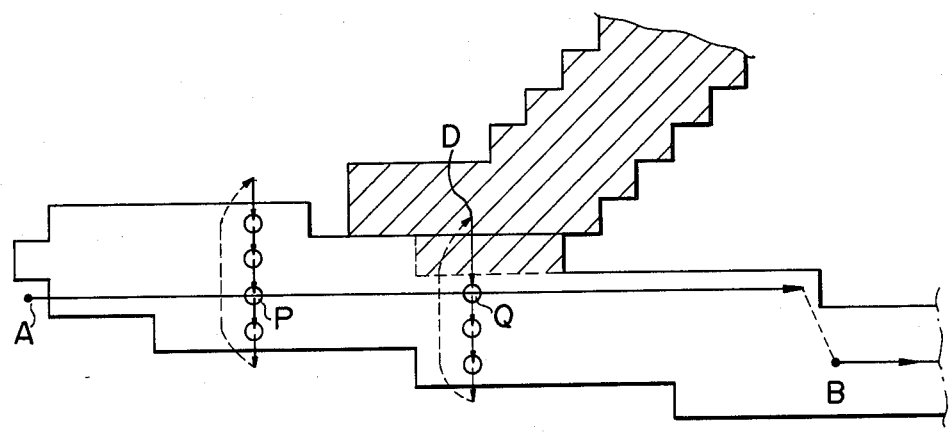
Figure 9:
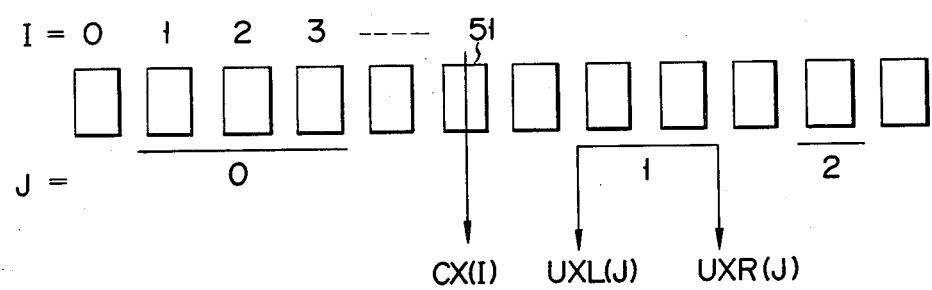
FIG. 9 explains how the character patterns and the underline patterns are edited in the embodiment FIG. 4.
Figure 12:
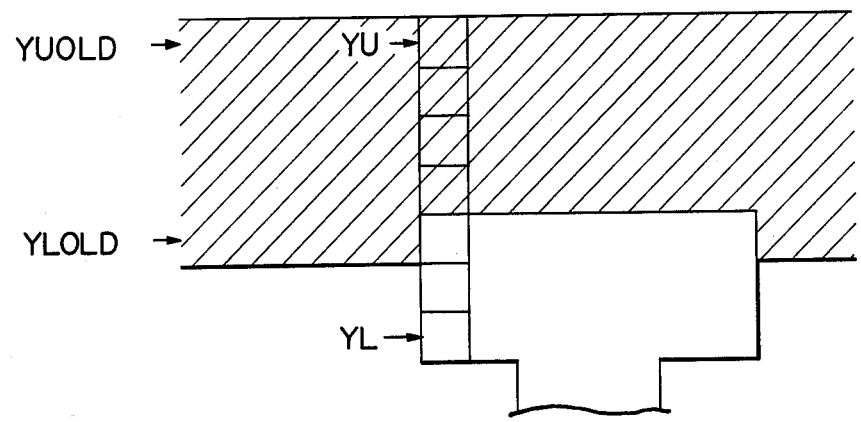
FIG. 12 explains how to erase the underline pattern when the pattern has a width of seven dots or more and has a straight upper edge.
Figure 13:
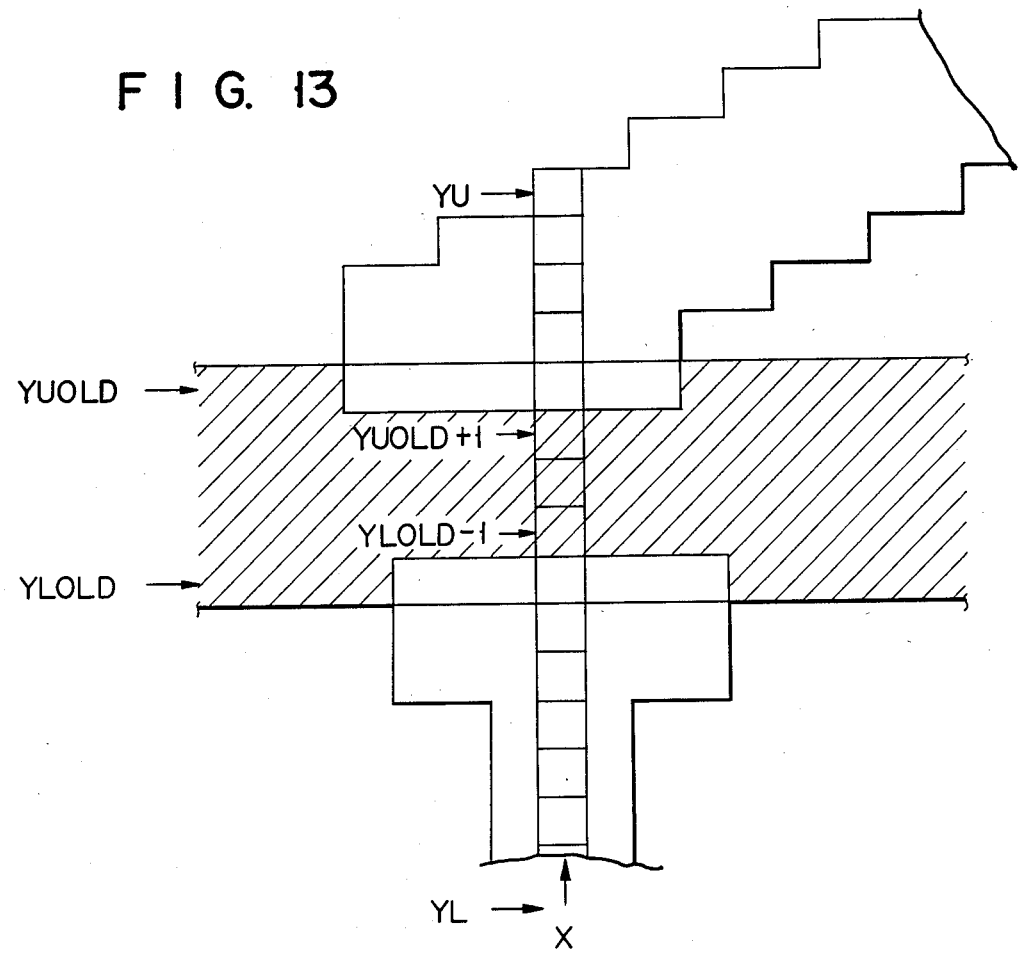
FIG. 13 illustrates how to erase the underline pattern when the pattern has a width of seven dots or more and has straight upper and lower edges.

First, as shown in FIG. 8, the points P and Q are selected as the start points of the check points. If the original check points P and Q are detected to be "black dot" data, white data are written in the points. Then, the check points are shifted vertically, by one dot, below the original dots P and Q and a similar operation is repeated until the check points are shifted vertically, by five dots, below the original dots. The detection of "white dot" data in the check points P and Q means that the lower edge of the underline pattern U is detected. After the white data of five dots has written from the start points or if the white data is detected before the check points are shifted by five dots, the check points are shifted vertically from the start points P and Q by five dots in the upper direction.

If the check point Q shifted vertically by five dots in the upper direction is the point D (black dot) in FIG. 8, it is determined as the lower portion of a character, for example a small letter "y" which contacts the underline. Then, the check points are shifted vertically, by 2 dots, below point D so as not to erase the lower part of the character pattern. On the other hand, when the check point shifted vertically above the original point is detected to be "white data", it is determined that the check point is located above the upper edge of the underline 7. Thus, the check point is shifted one dot below. If the shifted check point is detected to be "black dot", "white" dot is written in the point, and the check point is further shifted by one dot. Such an operation is repeated until the check points are returned to the original check points P and Q.

When the pattern-erasing operation described above is completed for all scanning lines UL0, UL1 (i.e., line B in FIG. 8), UL2 . . . , only the black dots forming the hatched portion (FIG. 8) remain in column pattern memory 25. In other words, underline pattern U is erased from column pattern memory 25. The number of dots vertically arranged above or below any dot on each horizontal scanning line, which are to be scanned, is not limited to five. It can be changed according to the size of characters to be recognized, the line width thereof, and the resolution of photodetector 17.

Character patterns 25a are read from column pattern memory 25 and normalized by normalizing circuit 33. The normalized character patterns are supplied to similarity computation circuit 37. Circuit 37 computes the similarity of each character pattern 25a with the reference patterns 53a read from dictionary memory 35. The character code 37a corresponding to the most similar reference pattern is input to microprocessor 31. In accordance with the character code 37a and the position data of underline pattern U, microprocessor 31 determines whether the character is underlined or not. When the vertical coordinate CX(I) of the least rectangular box 51 of each character pattern exists between the coordinate data UXL(J) and UXR(J) of the underline, microprocessor 31 determines that the character is underlined. Conversely, when the coordinate data CX(I) is not between coordinate data UXL(J) and UXR(J), microprocessor 31 outputs the recognition result in which the character code and the underline code are edited, or the recognition result in which the underline start code, character codes, and the underline stop code are edited.

As mentioned above, the patterns of underlined characters are temporarily stored in column pattern memory 25. Underline pattern U is erased from memory 25, and at the same time, the position data of pattern U is stored in the memory provided within microprocessor 31. Each character pattern is compared with the reference patterns stored in dictionary memory 35. The character code 37a corresponding to the most similar reference pattern is input to microprocessor 31. Microprocessor 31 adds or does not add underline pattern to this reference pattern in accordance with the position data. Hence, complex data processings which are required in the prior art to extract the character patterns from column pattern memory 25 to separate them from pattern U stored in memory 25, need not be carried out. Moreover, even if the line spacing of the scanned document is narrow, only underline pattern U can be erased from column pattern memory 25; the lower portion of any character pattern is not erased. The character patterns can thus be accurately recognized.

Another embodiment of the present invention will now be described with reference to FIG. 10. This figure illustrates how an underline pattern U is erased from memory 25. In this embodiment, the underline has a width of 4 dots. An underline pattern U is detected in the same way as in the embodiment of FIGS. 5-7, but it is erased from memory 25 in the following manner.

In FIG. 10, "." denotes a white dot which has taken the place of a black dot, YU designates the coordinates of the upper edge of underline pattern U, YL represents the coordinates of the lower edge of pattern U. YUOLD are the coordinates of the upper edge of the erased pattern U, and YLOLD are the coordinates of the lower edge of erased pattern U. Further, X shows the position of the vertical array of dots being subjected to the underline erasing operation. Although, underline U has a 4-dot width, it is preferred to have 6-dot width, including allowance, in order to eliminate influence due to the fluctuation of the underline. Nonetheless, when $YL-YU \leq 5$, that is, when the width of underline U is less than six dots, the dots forming vertical array X are considered to form a part of underline pattern U and are thus erased from column pattern memory 25.

When $YL-YU \geq 6$ as shown in FIG. 11 and as in the case where the lowest portion of small letter "y" contacts an underline, the following three operations are selectively conducted.

$$|YLOLD-YL| \leq 1 \text{ and } YUOLD-YU \geq 2 \qquad (i)$$

When the upper portion projects and the lower portion is substantially flat, it can be determined that the underline exsists. Since YL—YLOLD=0 and YUOLD—YU$\leq$2 in the embodiment of FIG. 11, the lower four dots are erased. Then, the YLOLD is updated to YL and the YUOLD remains unchanged.

$$|YU-YUOLD| \leq 1 \text{ and } YL-YLOLD \geq 2 \qquad (ii)$$

When the upper portion is substantially flat and the lower portion projects, e.g., where the highest portion of capital "I" contacts an underline, the upper four dots can be regarded as part of the underline. Therefore, the upper four dots of array x are erased from the memory 25. In this case, YUOLD is updated to YUOLD and YLOLD remains unchanged.

$$YL-YLOLD \geq 2 \text{ and } YUOLD-YU \geq 2 \qquad (iii)$$

When both the upper and lower edges of the underline are not substantially flat, e.g., when the lowest portion of the small letter "y" and the highest portion of capital "I" contact the underlines, the dots of array X in the range from YUOLD +1 to YUOLD −1 are erased from the memory 25. In this case, both YUOLD and YLOLD remain unchanged.

What is claimed is:

1. An optical recognizing apparatus comprising:
   a pattern memory for storing the patterns of characters and the pattern of an underline, which are obtained by photoelectrically converting underlined characters printed on a sheet of paper;
   underline detecting means for detecting the patterns of the underline by scanning the patterns in said pattern memory, and for storing the positions of the detected underline patterns;
   underline erasing means for writing white data in the underline pattern region of said pattern memory to erase the underline pattern in accordance with the positions stored in said underline detecting means;
   recognizing means for reading the character patterns from said pattern memory wherein the underline pattern has been erased by said underline erasing means, and for recognizing the character patterns read from said pattern memory; and
   means for editing and producing the positions of underline pattern supplied from said underline detecting means and the recognition result supplied from said recognizing means.

2. An apparatus, according to claim 1, wherein said underline detecting means scans said pattern memory in row direction until a predetermined number of consecutive white dots are detected, thus detecting the longest track scan-line.

3. An apparatus, according to claim 2, wherein said underline detecting means consecutively checks the track scan-lines until the track scan-line, with a length of 0, is detected, and stores the series of track scan-lines as positional coordinate data comprising start point and end point coordinate data and length data.

4. An apparatus, according to claim 3, wherein said underline erasing means sets an original check point on the longest track scan-line among a plurality of track scan-lines drawn on the underline, writes white data if the check point is a black dot, repeats the white-data write operation while shifting the check point vertically, dot by dot, below the original check point, and the check point is shifted vertically from the original check point by a predetermined number of dots in the upper direction if any of the shifted check points is a white dot or the shift amount reaches a predetermined number of dots.

5. An apparatus, according to claim 4, wherein said underline erasing means determines the check point as a part of a character which contacts the underline if the upwardly-shifted check point is black data, shifts the check point downward by a predetermined number of dots, shifts the check point downward by a number of dots less than the predetermined number of dots if the upwardly-shifted checkpoint is a white dot, erases the dot and shifts the check point by one dot if it is a black dot and repeats the erase and one-dot downward shift operation until the check point reaches the original check point.

6. An apparatus, according to claim 3, wherein said underline erasing means erases all the dots between the upper coordinate position and the lower coordinate position if the value of the lower coordinate position—the upper coordinate position is not more than a predetermined number of dots and when the value of the lower coordinate position—the upper coordinate position is more than or equal to the predetermined number of dots, erases a predetermined number of dots less than the dots corresponding to the full width of the underline if the lower edge of the underline is substantially flat, erases a predetermined number of dots less than the dots corresponding to the full width of the underline if the upper edge of the underline is substantially flat and, erases the dots of [(all dots corresponding to the full width of the underline)−{(the predetermined number of dots from the upper edge of the underline)+(the predetermined number of dots from the lower edge of the underline)}] if both edges of the underline are not substantially flat.

* * * * *